(12) United States Patent
Sekine et al.

(10) Patent No.: US 8,589,866 B2
(45) Date of Patent: Nov. 19, 2013

(54) AUTOMATICALLY GENERATING CAPABILITY-BASED COMPUTER PERIPHERAL DEVICE DRIVERS

(75) Inventors: Hitoshi Sekine, Los Altos, CA (US);
Alain Regnier, Sunnyvale, CA (US);
Yao-Tian Wang, Sunnyvale, CA (US);
Yue Liu, San Jose, CA (US); Senthil Selvaraj, Snoquaimie, WA (US);
Zhenning Xiao, Renton, WA (US)

(73) Assignee: Ricoh Company, Ltd., Tokyo (JP)

( * ) Notice: Subject to any disclaimer, the term of this patent is extended or adjusted under 35 U.S.C. 154(b) by 1587 days.

(21) Appl. No.: 11/846,926

(22) Filed: Aug. 29, 2007

(65) Prior Publication Data

US 2009/0063718 A1    Mar. 5, 2009

(51) Int. Cl.
*G06F 9/44* (2006.01)

(52) U.S. Cl.
USPC .......................................................... 717/106

(58) Field of Classification Search
USPC ................................................. 717/106–107
See application file for complete search history.

(56) References Cited

U.S. PATENT DOCUMENTS

| | | | |
|---|---|---|---|
| 5,467,434 A | 11/1995 | Hower et al. | |
| 5,513,126 A | 4/1996 | Harkins et al. | |
| 5,692,111 A * | 11/1997 | Marbry et al. | 358/1.15 |
| 5,768,483 A | 6/1998 | Maniwa et al. | |
| 5,845,076 A | 12/1998 | Arakawa | |
| 5,875,350 A | 2/1999 | Comp et al. | |
| 5,996,029 A | 11/1999 | Sugiyama et al. | |
| 5,999,945 A | 12/1999 | Lahey et al. | |
| 6,148,346 A | 11/2000 | Hanson | |
| 6,351,320 B1 | 2/2002 | Shin | |

(Continued)

FOREIGN PATENT DOCUMENTS

| | | |
|---|---|---|
| GB | 2347766 | 9/2000 |
| JP | 2002-014786 | 1/2002 |

(Continued)

OTHER PUBLICATIONS

European Patent Office, "European Search Report", application No. Ep 07250298, dated Feb. 23, 2010, 8 pages.

(Continued)

*Primary Examiner* — Wei Zhen
*Assistant Examiner* — Lanny Ung
(74) *Attorney, Agent, or Firm* — Hickman Palermo Truong Becker Bingham Wong LLP

(57) ABSTRACT

In an embodiment, a data processing system comprises device driver generation logic that is encoded in one or more computer-readable storage media for execution and which when executed is operable to perform receiving a first capability description from a computer peripheral device, wherein the first capability description describes one or more capabilities of the computer peripheral device; receiving a generic device driver file; receiving configuration data; automatically generating a device driver for the computer peripheral device and for a computer operating system based on the first capability description, the generic device driver file and the configuration data; device job processing logic that is configured to receive a request to use the computer peripheral device, to request and receive current first capability description from the computer peripheral device at the time of the request, to generate based on the current first capability description and send to the computer peripheral device job ticket data that describes a job for the computer peripheral device to perform, and to provide job data formatted in a page description language to the computer peripheral device.

20 Claims, 12 Drawing Sheets

FIG. 6

(56) References Cited

U.S. PATENT DOCUMENTS

| | | |
|---|---|---|
| 6,421,135 B1 | 7/2002 | Fresk et al. |
| 6,789,111 B1 | 9/2004 | Brockway et al. |
| 6,825,941 B1 | 11/2004 | Nguyen et al. |
| 6,952,831 B1 | 10/2005 | Moore |
| 6,967,728 B1 | 11/2005 | Vidyanand |
| 6,975,820 B2 | 12/2005 | Wong |
| 7,082,574 B2 | 7/2006 | Ogino et al. |
| 7,136,941 B2 | 11/2006 | Nguyen et al. |
| 7,162,518 B2 | 1/2007 | Takahashi |
| 7,321,443 B2 | 1/2008 | Berkema et al. |
| 7,522,299 B2 | 4/2009 | Nguyen et al. |
| 7,633,403 B2 | 12/2009 | Abe et al. |
| 7,728,999 B2 | 6/2010 | White et al. |
| 7,809,807 B2 | 10/2010 | Tominaga |
| 7,849,094 B2 | 12/2010 | Arai |
| 8,099,486 B2 | 1/2012 | Nakamura et al. |
| 8,243,294 B2 | 8/2012 | Herrmann et al. |
| 2001/0050684 A1 | 12/2001 | Smith |
| 2002/0030840 A1 | 3/2002 | Itaki et al. |
| 2002/0054339 A1 | 5/2002 | Arakawa |
| 2002/0078160 A1 | 6/2002 | Kemp et al. |
| 2002/0171857 A1 | 11/2002 | Hisatomi et al. |
| 2002/0174444 A1 | 11/2002 | Gatto et al. |
| 2002/0184294 A1* | 12/2002 | Volkoff et al. ............... 709/104 |
| 2003/0033368 A1 | 2/2003 | Tominaga |
| 2003/0174357 A1 | 9/2003 | Lester et al. |
| 2003/0184782 A1* | 10/2003 | Perkins et al. ............... 358/1.13 |
| 2004/0111418 A1 | 6/2004 | Nguyen et al. |
| 2004/0179231 A1 | 9/2004 | Savino et al. |
| 2004/0246505 A1 | 12/2004 | Oh |
| 2004/0263900 A1 | 12/2004 | Nguyen et al. |
| 2005/0030557 A1 | 2/2005 | Wiechers |
| 2005/0030577 A1 | 2/2005 | Wiechers |
| 2005/0043846 A1 | 2/2005 | Wiechers |
| 2005/0046886 A1 | 3/2005 | Ferlitsch |
| 2005/0099650 A1 | 5/2005 | Brown et al. |
| 2005/0162688 A1 | 7/2005 | Nakaoka et al. |
| 2005/0180770 A1 | 8/2005 | Wong |
| 2005/0210227 A1 | 9/2005 | Emerson |
| 2005/0213136 A1 | 9/2005 | Noyama et al. |
| 2005/0223390 A1 | 10/2005 | Moore |
| 2005/0225795 A1 | 10/2005 | Nuggehalli et al. |
| 2006/0023244 A1 | 2/2006 | Mitsui |
| 2006/0029414 A1 | 2/2006 | Wong |
| 2006/0114493 A1 | 6/2006 | Slightam |
| 2006/0120349 A1 | 6/2006 | Taylor et al. |
| 2006/0221372 A1 | 10/2006 | Onishi et al. |
| 2006/0268328 A1 | 11/2006 | Park et al. |
| 2007/0002355 A1 | 1/2007 | Kai |
| 2007/0002368 A1 | 1/2007 | Corona |
| 2007/0008560 A1 | 1/2007 | Eschbach |
| 2007/0013935 A1 | 1/2007 | Uchida |
| 2007/0052992 A1 | 3/2007 | Yamada |
| 2007/0086023 A1 | 4/2007 | Kadota |
| 2007/0097399 A1 | 5/2007 | Boyd et al. |
| 2007/0136485 A1 | 6/2007 | Mitsui |
| 2007/0174521 A1 | 7/2007 | Aritomi |
| 2007/0214409 A1 | 9/2007 | Miyata |
| 2007/0263242 A1 | 11/2007 | Takahashi et al. |
| 2008/0007742 A1 | 1/2008 | Abe et al. |
| 2008/0059978 A1 | 3/2008 | Nishio |
| 2008/0068635 A1 | 3/2008 | Asano |
| 2008/0180728 A1 | 7/2008 | Sekine |
| 2008/0192121 A1 | 8/2008 | Hashimoto |
| 2008/0231886 A1 | 9/2008 | Wehner et al. |
| 2008/0239373 A1 | 10/2008 | Suzuki |
| 2008/0297838 A1 | 12/2008 | Matsui et al. |
| 2008/0301277 A1 | 12/2008 | Tsujiguchi |
| 2009/0040549 A1 | 2/2009 | Miyamoto |
| 2009/0063718 A1 | 3/2009 | Sekine et al. |
| 2009/0190150 A1 | 7/2009 | Selvaraj |
| 2010/0027040 A1 | 2/2010 | Kuroda |
| 2010/0225933 A1 | 9/2010 | Xiao et al. |
| 2010/0225957 A1 | 9/2010 | Liu et al. |
| 2010/0225958 A1 | 9/2010 | Selvaraj et al. |
| 2010/0225959 A1 | 9/2010 | Selvaraj et al. |

FOREIGN PATENT DOCUMENTS

| | | |
|---|---|---|
| JP | 2002024495 A | 1/2002 |
| JP | 2002331730 A | 11/2002 |
| JP | 2003233482 A | 8/2003 |
| JP | 2005148953 A | 6/2005 |
| JP | 2005228148 A | 8/2005 |
| JP | 2006/024199 A | 1/2006 |
| JP | 2007-034899 | 8/2007 |
| JP | 2007-200247 | 8/2007 |
| JP | 2008219419 A | 8/2008 |
| WO | WO 2004/070607 A1 | 8/2004 |

OTHER PUBLICATIONS

Device Driver. Wikipedia, the free encyclopedia. [retrieved on Sep. 8, 2008]. Retrieved from the Internet: <URL: http://en.wikipedia.org/wiki/Device_driver>.

Page Description Language. Wikipedia, the free encyclopedia. [retrieved on Sep. 8, 2008]. Retrieved from the Internet: <URL: http://en.wikipedia.org/wiki/Page_description_language>.

Systems Inc., "PostScript Printer Description File Format Specification 4.3—Chapters 1 & 2", Internet Citation, XP002158174, retrieved from http://partners.adobe.com/asn/developer/pdfs/tn/5003.PPD_Spec_v4.3.pdf, 18 pages.

European Patent Office, "European Search Report", application No. EP 09151185, 8 pages.

European Patent Office, "European Search Report", application No. 08163180.6-2211, dated Nov. 11, 2008, 10 pages.

Katayama et al., "Prototype of the device driver generation system for unix-like operating systems", Principles of Software Evolution, 2000, XP 010537526, 10 pages.

Katayama et al., "Proposal of a support system for device driver generation", Software Engineering conference, 1999, APSEC 1999 proceedings, XP010363982, 4 pages.

Sweet, Michael, "An Overview of the Commom UNIX Printing System", Easy Software Products, XP002501773, Jul. 2000, 8 pages.

Shaojie, Wang, et al., "Synthesizing operating system based device drivers in embedded systems", International Conference on Hardware/Software Codesign and system Synthesis, Oct. 2003, XP010688137, 8 pages.

European Patent Office, "Office Action", in application No. 09 151 185.7, dated May 9, 2012, 8 pages.

U.S. Appl. No. 11/846,884, filed Aug. 29, 2007, Advisory Action, Sep. 19, 2011.

U.S. Appl. No. 11/846,884, filed Aug. 29, 2007, Office Action, Oct. 26, 2011.

U.S. Appl. No. 12/019,610, filed Jan. 24, 2008, Final Office Action, Sep. 26, 2012.

U.S. Appl. No. 11/846,884, filed Aug. 29, 2007, Notice of Allowance, Mar. 1, 2012.

U.S. Appl. No. 12/019,610, filed Jan. 24, 2008, Office Action, Mar. 30, 2012.

U.S. Appl. No. 12/399,799, filed Mar. 6, 2009, Final Office Action, Sep. 18, 2012.

U.S. Appl. No. 12/399,799, filed Mar. 6, 2009, Office Action, Apr. 23, 2013.

U.S. Appl. No. 12/019,610, filed Jan. 24, 2008, Final Office Action, Nov. 25, 2011.

U.S. Appl. No. 12/399,891, filed Mar. 6, 2009, Office Action, Jun. 6, 2012.

U.S. Appl. No. 13/399,895, filed Mar. 6, 2009, Office Action, Jun. 19, 2012.

U.S. Appl. No. 12/399,884, Mar. 6, 2009, Office Action, Jun. 21, 2012.

U.S. Appl. No. 12/399,799, filed Mar. 6, 2009, Office Action, Jun. 8, 2012.

U.S. Appl. No. 12/399,844, filed Mar. 6, 2009, Final Office Action, Nov. 26, 2012.

(56) References Cited

OTHER PUBLICATIONS

U.S. Appl. No. 12/399,891, filed Mar. 6, 2009, Final Office Action, Nov. 28, 2012.
U.S. Appl. No. 12/399,895, filed Mar. 6, 2009, Notice of Allowance, Jan. 2, 2013.
U.S. Appl. No. 12/399,884, filed Mar. 6, 2009, Advisory Action, Feb. 12, 2013.
U.S. Appl. No. 11/846,869, filed Aug. 29, 2007, Final Office Action, Oct. 27, 2011.
U.S. Appl. No. 11/846,884, filed Aug. 29, 2007, Office Action, Jun. 3, 2011.
U.S. Appl. No. 11/846,869, filed Aug. 29, 2007, Office Action, May 24, 2011.
U.S. Appl. No. 12/019,610, filed Jan. 24, 2008, Office Action, May 24, 2011.
U.S. Appl. No. 12/399,891, filed Mar. 6, 2009, Notice of Allowance, Correspondence Mailing Date, Mar. 14, 2013.

\* cited by examiner

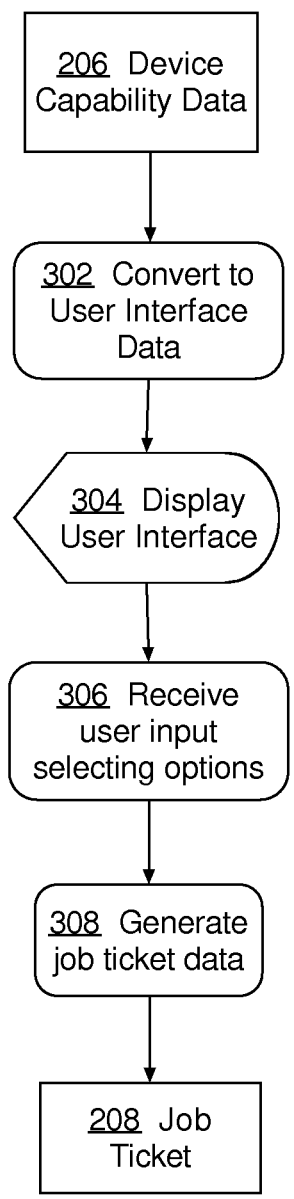

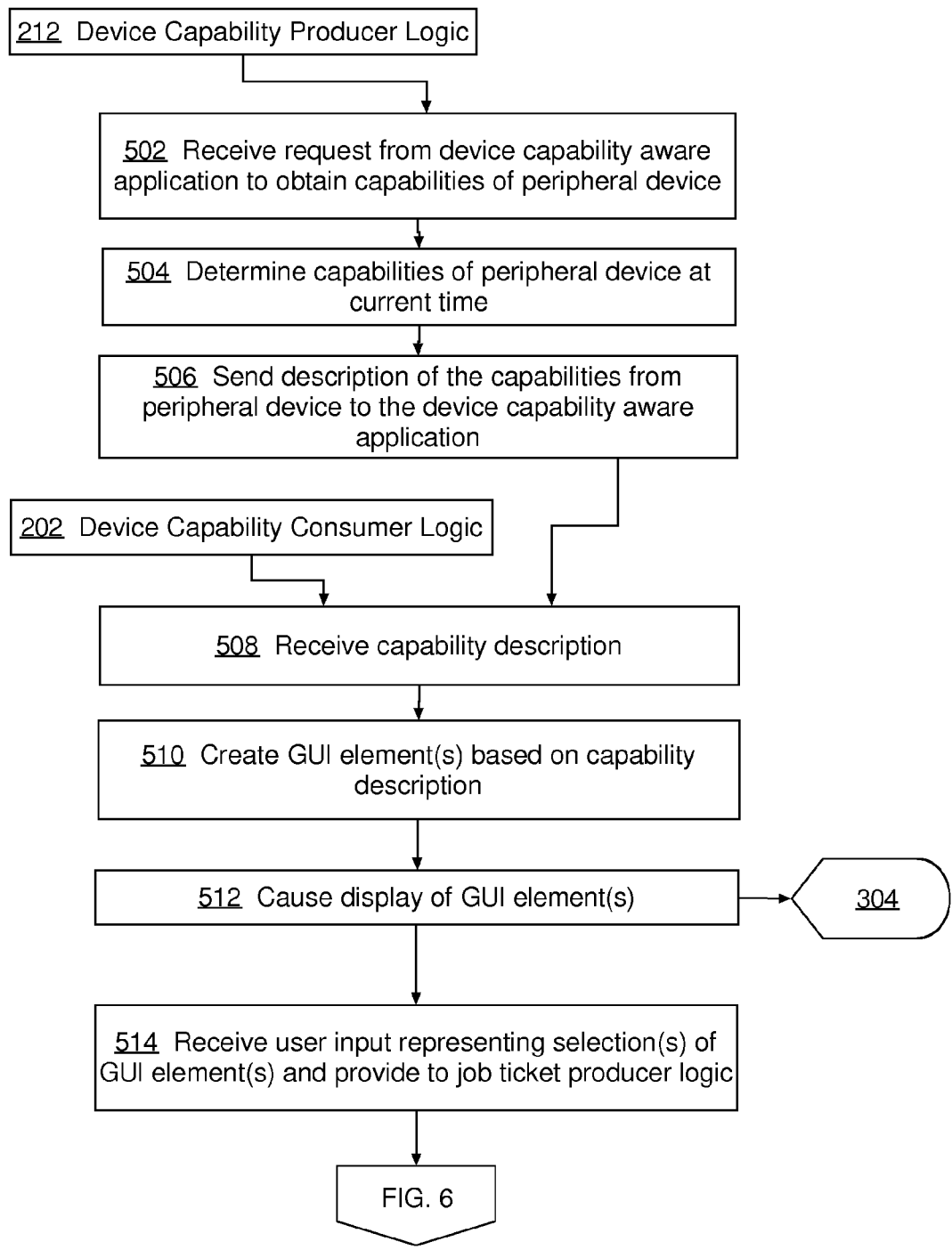

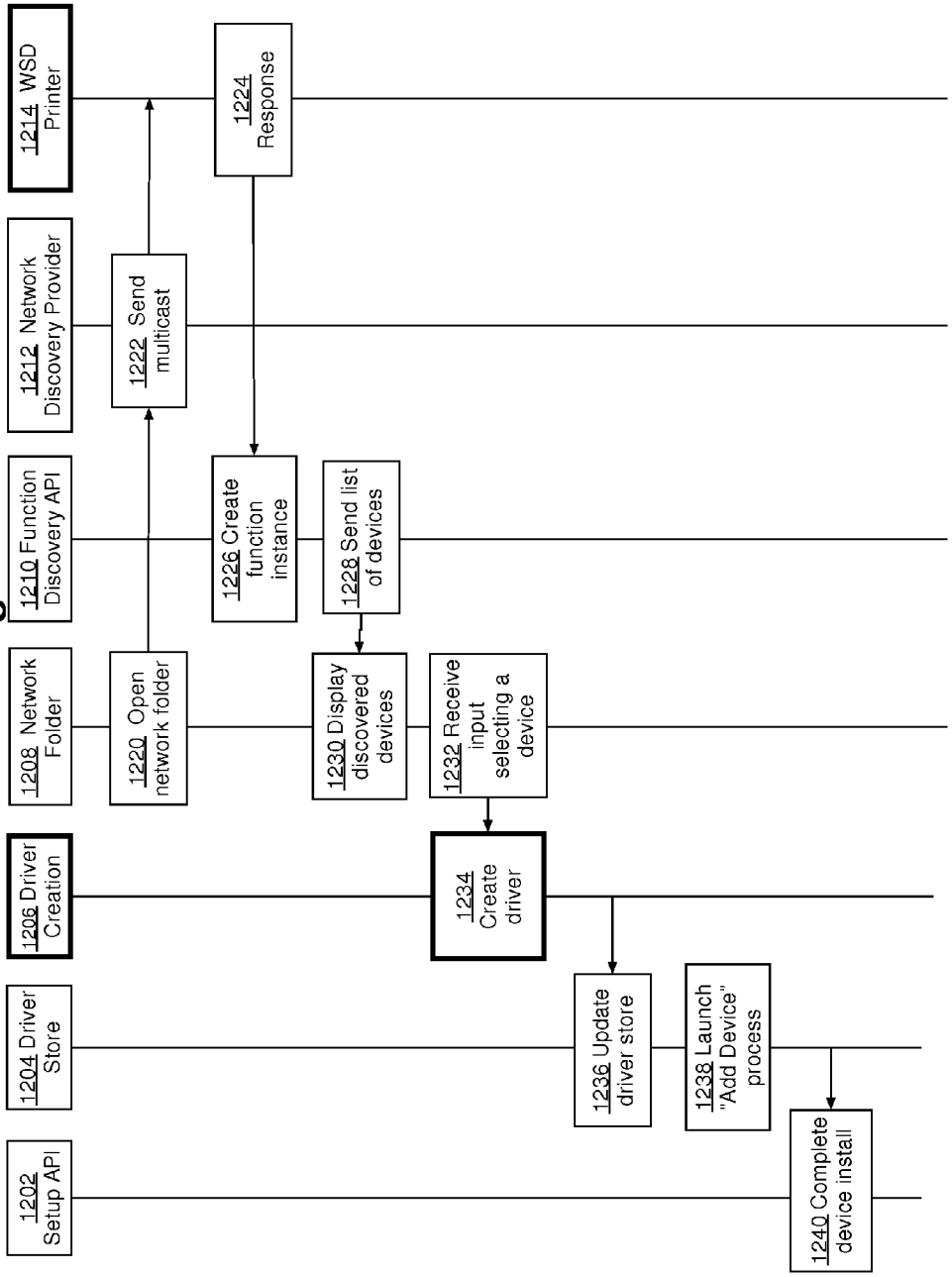

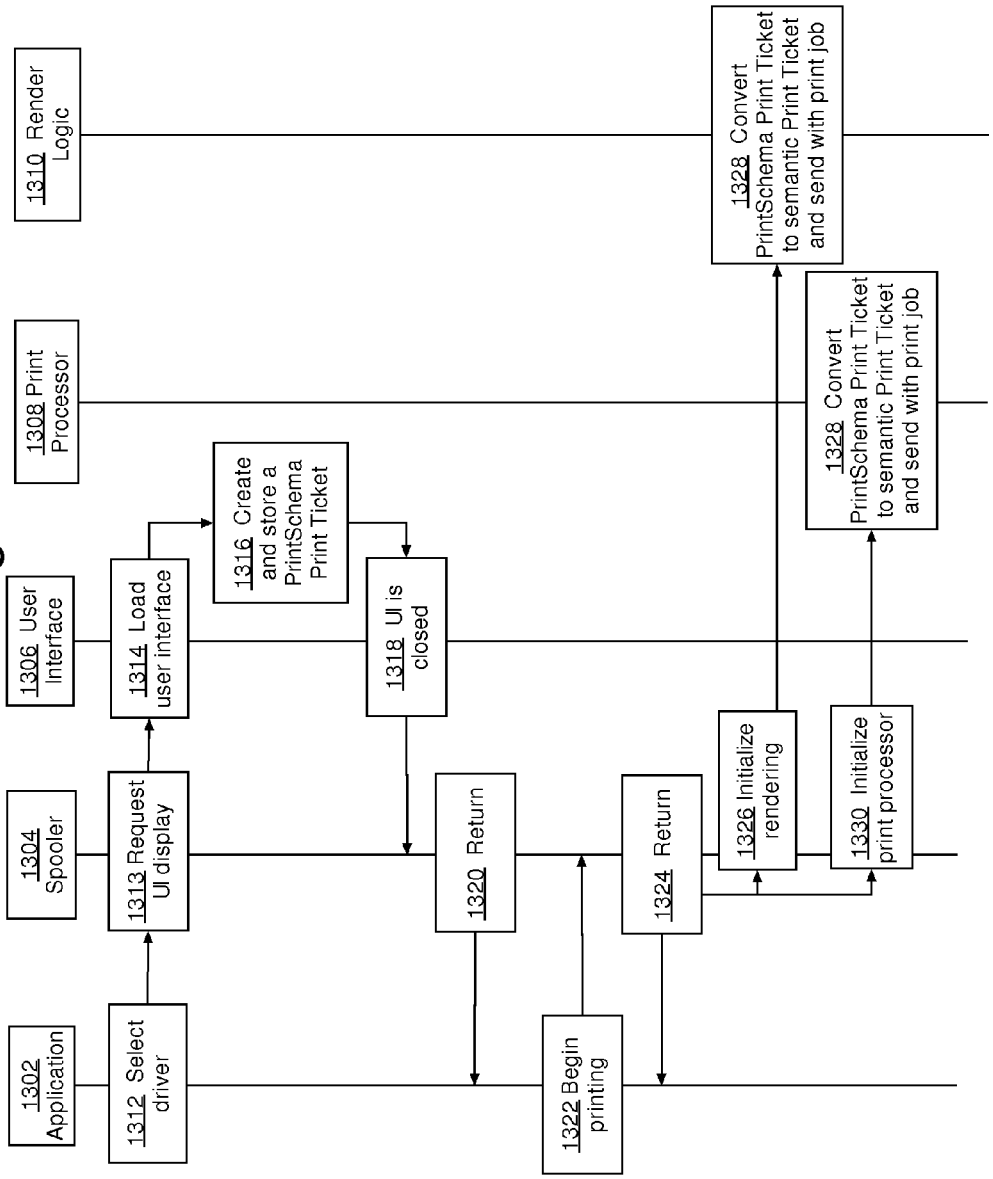

AUTOMATICALLY GENERATING CAPABILITY-BASED COMPUTER PERIPHERAL DEVICE DRIVERS

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer device drivers, job ticket-based devices, and Page Description Language (PDL) peripheral device environments.

BACKGROUND

Peripheral devices can be coupled to computers. Application programs running on computers normally control the peripheral devices through device drivers, and a different specific device driver is used for each different kind of peripheral device. The device drivers typically are specific to the device type, the processor and operating system (platform) on which the device driver is running, and sometimes even to the type of data that the platform generates.

Each device driver serves as an interface for an operating system or application program to communicate with a peripheral device. Device drivers generally are hardware-dependent and each device driver is designed for a particular type of peripheral device hardware such as a printer, scanner, video adapter, network interface card, sound card, digital camera, etc.

For printer devices, device drivers are termed printer drivers and interact with application programs that generate a graphics object, which is data that can be printed on paper. A printer driver also controls printer device hardware features and settings, such as output paper tray and paper size. The printer driver converts requests issued from an application program into a printer-specific control language termed PDL (Page Description Language) such as PostScript, PCL, PJL, etc. Data communicated between a printer driver and printer hardware includes both printable data and hardware control commands mixed together in a PDL data stream.

Some high-end printer devices, especially those used in commercial or large-scale production printing environments, support job ticket-based printer control using commands expressed in Job Definition Format (JDF). JDF allows a printer driver to submit to the printer job ticket-based printer control commands in one data stream, and printable data in a second data stream that is sent to the printer at a separate time. In this approach, control commands and printable data are not mixed.

In a typical approach, to set up job-related settings for a particular job relating to a particular peripheral device, an application invokes the device driver and displays a static user interface through which the user can select various parameter values or other job settings. The driver interprets the selections and transforms the selections into a set of job setting data. The driver sends the job setting data to the device, either bundled with substantive job data or separately using a data structure or message termed a "job ticket."

Development of conventional device drivers is complex. A device manufacturer normally is required to devote substantial resources to develop a wide array of drivers to account for every permutation of devices made by the manufacturer and target computer platforms. Further, the user interface provided by a device driver is normally static and fixed, so that if the device is upgraded with a new feature, the manufacturer also must update the driver to present the new feature in an updated user interface.

A Universal Serial Bus (USB) flash memory storage device is an example of a peripheral storage device that suffers from limitations associated with conventional device drivers. In current MICROSOFT WINDOWS environments, a typical USB storage device or "memory stick" does not require a user to install new software to read or write to the device, because each of MICROSOFT WINDOWS XP and MICROSOFT WINDOWS VISTA includes a standard USB storage device driver. While this is convenient, manufacturers of competing USB storage devices are required to conform to the standard features that are supported in the WINDOWS device driver. Manufacturer-specific features are not possible, and different manufacturers can only compete in the marketplace on the basis of price and form factor, not internal technical features.

Microsoft Corporation has introduced a document format termed XML Paper Specification (XPS) that includes a job ticket format termed PrintSchema for the purpose of controlling printer hardware.

Device drivers for scanner devices, termed scanner drivers, interact with application programs for retrieving a scanned image. Data communicated between the scanner driver and the scanner device includes scanned image data and scanner device-specific control commands. The image data and scanner control commands can be mixed together in a format such as TWAIN.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In an embodiment, a data processing system comprises device driver generation logic that is encoded in one or more computer-readable storage media for execution and which when executed is operable to perform receiving a first capability description from a computer peripheral device, wherein the first capability description describes one or more capabilities of the computer peripheral device; receiving a generic device driver file; receiving configuration data; automatically generating a device driver for the computer peripheral device and for a computer operating system based on the first capability description, the generic device driver file and the configuration data; device job processing logic that is configured to receive a request to use the computer peripheral device, to request and receive current first capability description from the computer peripheral device at the time of the request, to generate based on the current first capability description and send to the computer peripheral device job ticket data that describes a job for the computer peripheral device to perform, and to provide job data formatted in a page description language to the computer peripheral device.

In an embodiment, the device driver generation logic further comprises logic which when executed is operable to perform receiving, from the operating system, user input representing a request to install a newly discovered computer peripheral device, and performing the automatically generating in response to the user input.

In an embodiment, the device driver generation logic further comprises logic which when executed is operable to perform receiving, from the computer peripheral device, metadata that identifies attributes of the computer peripheral device, and wherein the logic for generating includes logic for generating the device driver based on the metadata.

In an embodiment, the device driver generation logic further comprises logic which when executed is operable to perform receiving, from the computer peripheral device, device configuration data that identifies model-specific features and options of the computer peripheral device, and wherein the logic for generating includes logic for generating the device driver based on the device configuration data.

In an embodiment, the device driver generation logic further comprises logic which when executed is operable to perform receiving a mapping file that maps a first set of resources of the computer peripheral device in a first language to a second set of resources in a second language, and wherein the logic for generating includes logic for generating the device driver based on the mapping file.

In an embodiment, the configuration data comprises rendering modules, user interface modules, and attribute values associated with building a device driver package.

In an embodiment, the device driver generation logic is configured to merge the job ticket data into a stream of the job data formatted in a page description language that is sent to the computer peripheral device.

In an embodiment, in the computer peripheral device, job ticket consumer logic is encoded in one or more computer-readable storage media for execution and when executed is operable to perform: transforming the job ticket data into one or more device-specific operational commands for the computer peripheral device; causing the computer peripheral device to execute the operational commands.

In an embodiment, the computer peripheral device comprises any of a printer, a multifunction printing device, a scanner, a finishing machine, a digital camera, or a monitor. In an embodiment, the job ticket data comprises a subset of the first capability description.

In an embodiment, the first capability description comprises a list of features of the computer peripheral device, property names of properties of the features, values of the properties, and options for the properties, expressed in any of Job Definition Format (JDF) or Print Schema Specification.

In an embodiment, the first capability description comprises a list of features of the computer peripheral device and one or more feature constraints, and the one or more feature constraints comprise (a) limitations on the availability of the capabilities or (b) settings for capabilities that are required by an availability of another capability or by another setting of another capability.

In an embodiment, the device driver generation logic further comprises logic which when executed causes generating the device driver configured to display a list of a plurality of available peripheral devices, receive second user input representing a selection of one of the available peripheral devices, and send the request to the selected one of the available peripheral devices represented in the second user input.

Other embodiments encompass a computer-implemented method and computer-readable data storage media configured according to the steps described above and encoded with instructions to perform the functions herein.

BRIEF DESCRIPTION OF THE DRAWINGS

In the drawings:

FIG. 3 illustrates an example process of capability-based control of a computer peripheral device.

FIG. 5 illustrates example functions of device capability producer logic and device capability consumer logic.

FIG. 12 is a ladder diagram showing automatic driver creation and installation.

FIG. 13 is a ladder diagram illustrating a printing operation using an automatically generated printer driver.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 Structural and Functional Overview

Generally, the technology disclosed herein enables software that is developed and deployed to support new peripheral devices, and new features of the peripheral devices, by exchanging device capabilities and job tickets. With the approach herein, a manufacturer of a peripheral device can introduce new products and new features without releasing a new device driver and without forcing users to update their software.

In an embodiment, when a device driver implements the techniques herein, an application program communicates with the device driver in the same manner as the application program communications with a conventional device driver. Thus, no change in the application program is needed to use a device driver that implements the techniques herein.

In an embodiment, a single driver can operate with all devices that can describe their own capabilities and features in a manner that the driver understands. Therefore, a single driver can work with multiple peripheral devices and there is no need to write a large array of drivers for every permutation of peripheral device and computer platform.

In an embodiment, job data is separable from job settings and device capability data. The driver sends a job ticket to the peripheral device, but the driver does not need to send job data to the device at the same time as the job ticket.

Embodiments are operable in environments in which job data is defined separately from job settings. For example, in a printing system, an application program, device driver, and printer device can generate and consume job data independently of job setting data. In an embodiment, Web Service printing methods are used. The application program and driver send the printer a PrintTicket message or JobTicket message separately from a job data package and the printer device processes the two parts separately and applies the settings in the PrintTicket while generating the print output from the job data.

Figure 1:
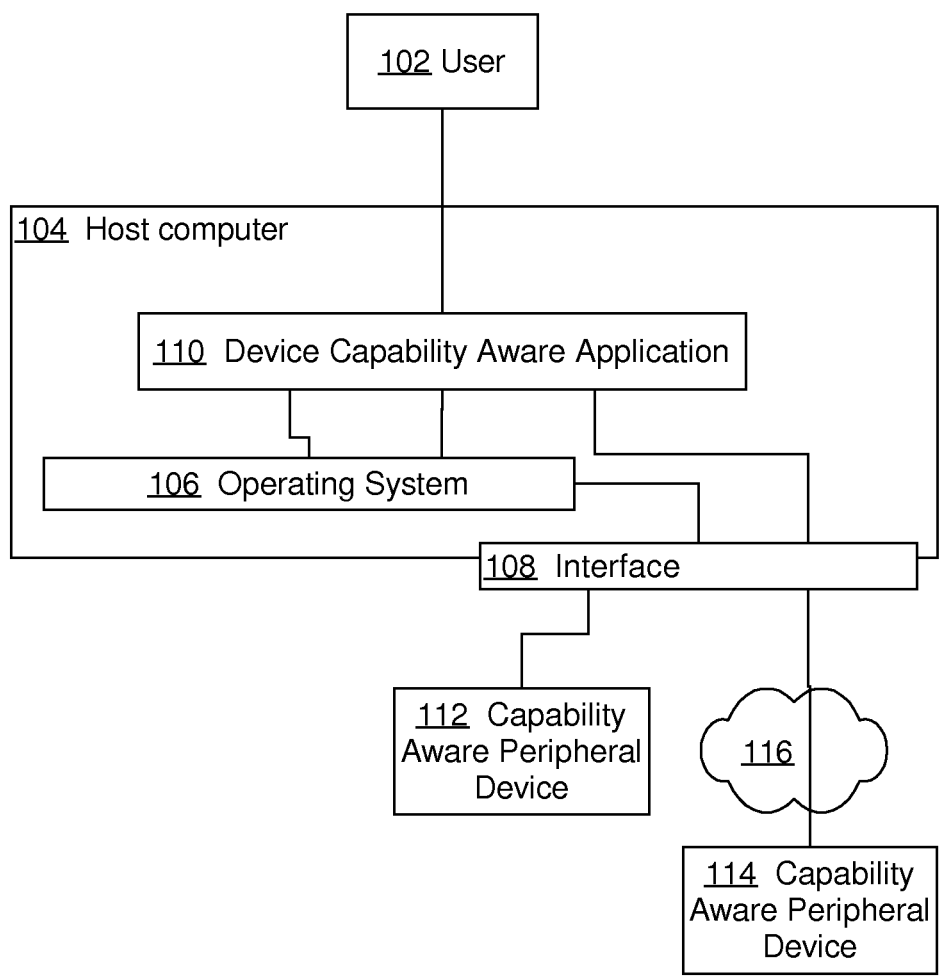
FIG. 1 illustrates an example computing system in which a device capability aware application and a capability aware peripheral device may be used.

2.0 Example of Implementation 2.1 Capability-Based Control of a Computer Peripheral Device FIG. 1 illustrates an example computing system in which a device capability aware application and a capability aware peripheral device may be used. In an embodiment, a user 102 interacts with a host computer 104, which may comprise a personal computer, workstation, server, wireless computing device, or any other form of host computer. The host computer 104 comprises an operating system 106 that hosts and controls a device capability aware application program 110. The host computer further comprises an interface 108 that is coupled, directly or indirectly through one or more networks 116, to one or more capability aware peripheral devices 112, 114. Each of capability aware peripheral devices 112, 114 might represent one of more physical devices, like a printer server.

Examples of operating system 106 include LINUX, UNIX, MACOS, and MICROSOFT WINDOWS. The device capability aware application program 110 may comprise any computer program that can perform useful operations in connection with the peripheral devices 112, 114. Examples of application program 110 include a device driver, word processor, a spreadsheet, an e-mail client, and a database client.

Interface 108 may comprise any hardware, firmware, software, or combination that can communicate data between the host computer 104 and the peripheral devices 112, 114 and network 116. Examples of interface 108 include a network interface card (NIC) comprising an Ethernet interface, Universal Serial Bus (USB) interface, serial interface, IEEE 1394 (FIREWIRE) interface, and parallel port. Proprietary data communications interfaces also may be used and embodiments do not require standards-based interfaces.

Embodiments may be used with any kind of computer peripheral device. Examples of peripheral devices 112, 114 with which embodiments may be used include printers, scanners, multifunction printers, finishing devices, storage systems, etc. FIG. 1 illustrates two (2) peripheral devices 112, 114 solely to show a clear example and embodiments may operate with any number of peripheral devices that are different or the same.

The device capability aware application 110 comprises one or more stored sequences of instructions, or other software elements, that implement the functions described herein. In general, the device capability aware application 110 can receive function calls from the operating system 106 or application program 110, and can interact with any of the peripheral devices 112, 114 to cause the peripheral devices to perform a job that the application program initiates. The device capability aware application 110 may comprise a device driver. The device capability aware application 110 can operate with any peripheral device that can provide a description of its features or capabilities as further described herein. The device capability aware application 110 may be integrated into operating system 106, application program 110, or other software elements or firmware elements of host computer 104, and embodiments do not require implementing the device capability aware application as a standalone software element.

Figure 2:
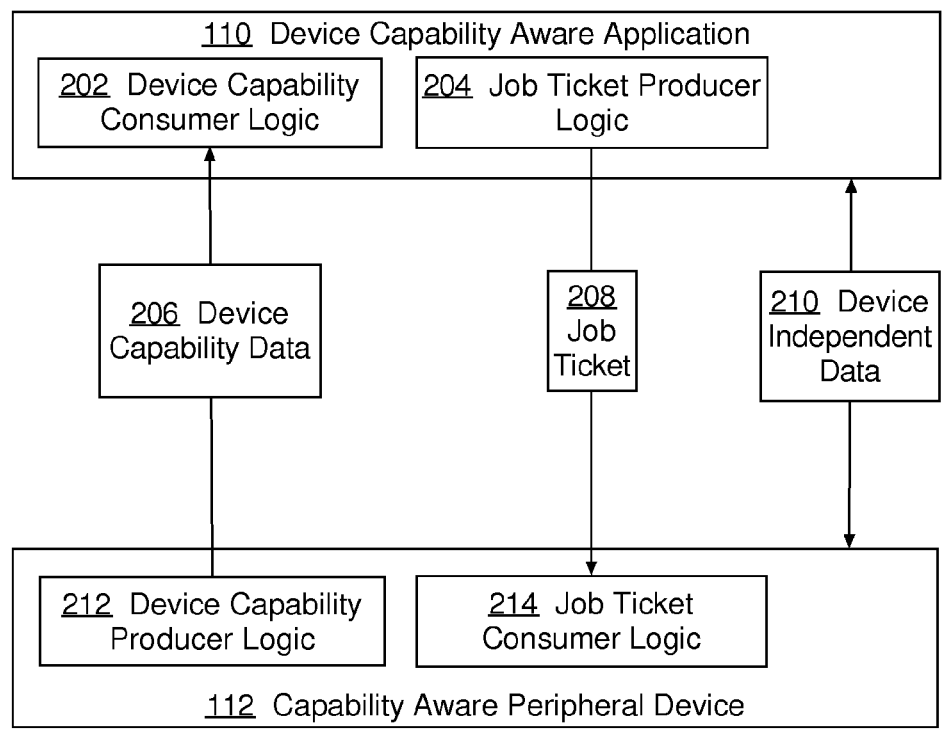
FIG. 2 illustrates data communicated between the device capability aware application and a capability aware peripheral device of FIG. 1.

FIG. 2 illustrates data communicated between the device capability aware application and a capability aware peripheral device of FIG. 1. In an embodiment, device capability aware application 110 comprises device capability consumer logic 202 and job ticket producer logic 204. A capability aware peripheral device 112 comprises device capability producer logic 212 and job ticket consumer logic 214.

The device capability consumer logic 202 can receive and understand device capability data 206. The job ticket producer logic 204 can produce and send job ticket data 208 to a device capability aware device application 110. The device capability producer logic 212 can produce and send device capability data 206 to the device capability aware application 110. The job ticket consumer logic 214 can receive, understand and execute job ticket data as commands for the capability aware peripheral device 112.

Device capability data 206 comprises data that describes one or more capabilities, features or functions of the capability aware peripheral device 112. The device 112 generates the device capability data 206 and provides it to the device capability aware application 110. The device capability data 206 is generated at the time of a request from the application 110, and therefore the data 206 can include a description of all then-current capabilities, features and functions of the device 112. For example, device capability data 206 could comprise information indicating that a printer has the following features: Document size: Letter, 11×17, Legal . . . ; Document source: Flatbed, Sheet feeder, . . . ; Resolution: 100×100 dpi, 200×200 dpi . . . ; etc.

The device capability data 206 may be expressed in various formats, methods and mechanisms. Examples of device capability data 206 that may be used in various embodiments include XML, XML-based representations, HTML, etc. Embodiments are not limited to XML or any other specific method or mechanism for describing capabilities of a device. However, the representation of a device capabilities represented in device capability data 206 is separate from the device independent data 210.

Job ticket 208 comprises a statement of settings, sent from application 110 to device 112, which instruction the device how to process a particular job associated with some or all of the device independent data 210. In an embodiment, application 110 communicates one or more job tickets 208 to the peripheral device 112. Generally, job tickets 208 comprise data that informs the peripheral device 112 about selections that a user, application or system has made from among available capabilities of the peripheral device as represented in device capability data 206. For example, job tickets 208 may identify paper trays, finishing options, or other job settings. A job ticket 208 could comprise a description of particular settings such as: Document size: Letter; Document source: Tray2; Scan resolution: 200×200 dpi; etc. In various embodiments, job tickets 208 may be expressed in XML, in the format of Web Services tickets, sets of name-value pairs, or in other descriptive text or data.

Device independent data 210 comprises data that can be used in the device 112 but does not comprise any hardware-specific command. For a device that processes still images, such as a scanner, digital camera, or monitor, device independent data 210 may comprise JPEG, TIFF, or GIF image data. For a printer device, the device independent data 210 may comprise a PDF file, EPS, PostScript file, which do not include hardware control commands. Alternatively, PCL data and any PDL having none or a minimum set of hardware control commands can be used as the device independent data 210.

In an embodiment, device capability aware application 110 and capability aware peripheral device 112 communicate data using any form of basic application-layer communication protocol that both the device capability aware application 110 and capability aware peripheral device 112 can support. FIG. 2 shows one capability aware peripheral device 112 to illustrate a clear example, but the communications of FIG. 2 may occur between the device capability aware application 110 and any capability aware peripheral device 112 with which it operates.

In one embodiment, the protocol comprises Web Services and each of the device capability aware application 110 and capability aware peripheral device 112 implement Web Services functions. For example, each of the device capability aware application 110 and capability aware peripheral device 112 may comprise Web Services logic that can generate application-layer messages according to the Web Services standards of the World Wide Web Consortium (w3c), and that can interpret and act upon such messages.

FIG. 3 illustrates an example process of capability-based control of a computer peripheral device.

In an embodiment, a device capability aware device generates device capability data 206 and sends the data to a device capability aware application. For example, as in FIG. 2, device 112 generates data 206 describing capabilities, features and functions of the device and sends the data to the application 110. Generating the data 206 may occur, for example, in response to the device 112 receiving a request from the application 110. The application 110 may issue such a request in response to receiving a request from another application to interact with the device 112, for example, to print a document, scan a document, etc.

At step 302, in response to receiving the device capability data 206, the device capability aware application converts the device capability data into user interface data and causes the user interface to be displayed as shown at block 304. For example, the application 110 converts data 206 into a tree view, causes the view to be displayed on a display of the host computer 104.

In step 306, user input selecting one or more options is received. For example, the application 110 receives user input representing user selections of options in the tree view.

In response, in step 308 job ticket data is generated based on the selections. For example, application 110 converts the received user input into the job ticket 208, based on the device capability data 206. In one embodiment, the conversion may comprise creating a job ticket 208 in an XML document by transforming one or more XML elements of the device capability data 206 according to an XML stylesheet transformation (XSLT) that also receives the user input.

One result of this approach is that even features that were recently added to the device 112 are reflected or listed in the device capability data 206. Further, the device capability aware application 110 is not required to know about such recently added features or new capabilities or what device control commands are required to invoke or use the recently added features or new capabilities. Instead, the device 112 describes its own features and command requirements to the application 110. The application 110 obtains user input about desired job settings, and produces a job ticket 208 that reflects such settings based on the features and command requirements in the device capability data 206.

In an embodiment, device capability data 206 and job ticket 208 are expressed in any of several job ticket formats such as Job Definition Format (JDF) and the Print Schema Specification, which is a part of the XML Paper Specification (XPS) of Microsoft Corporation. Other job ticket formats may be used and embodiments are not limited to using JDF or XPS.

Generally, device capability data 206 comprises a list of device features. In an embodiment, each feature is defined using a name, user interface display name, selection type. Examples of selection types include a selection list or enumeration, number, and string. A device capability definition may comprise a feature constraint, which is a limitation on the availability of one capability of the device, or a possible setting for that capability, which is dependent upon the availability of another capability or setting of the device.

TABLE 1 is an example of device capability data 206 expressed in Print Schema format:

TABLE 1

EXAMPLE DEVICE CAPABILITY DATA

```
<psf:Feature name="psk:JobDuplexAllDocumentsContiguously">
<psf:Property name="psf:SelectionType>
    <psf:Value xsi:type= "xsd:QName">psk:PickOne</psf:Value>
</psf:Property>
<psf:Property name="psk:DisplayName">
    <psf:Value xsi:type="xsd:string">Duplex</psf:Value>
</psf:Property>
</psf:Option name="psk:OneSided" constrained="psk:None">
<psf:Property name="psk:DisplayName">
<psf:Value xsi:type="xsd:string">Off</psf:Value>
</psf:Property>
</psf:Option>
<psf:Option name="psk:TwoSidedLongEdge" constrained="psk:None">
<psf:Property name="psk:DisplayName">
<psf:Value xsi:type="xsd:string">Long Edge</psf:Value>
</psf:Property>
<psf:Option name="psk:TwoSidedShortEdge" constrained="psk:None">
<psf:Property name="psk:DisplayName">
<psf:Value xsi:type="xsd:string">Short Edge</psf:Value>
</psf:Property>
</psf:Option>
</psf:Feature>
```

Figure 4:
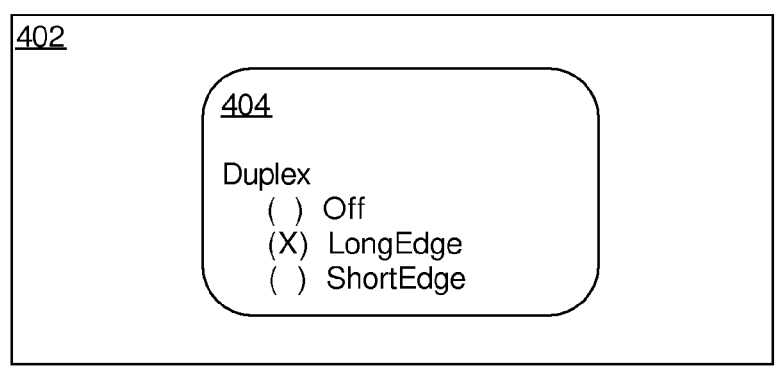
FIG. 4 illustrates an example graphical user interface for a peripheral device in which a Long Edge option is selected.

FIG. 4 illustrates an example graphical user interface for a peripheral device in which a Long Edge option is selected. The example of FIG. 4 corresponds to the example device capability data of Table 1.

In the example of FIG. 4, a screen display 402 generated by an application program comprises a user interface panel 404 configured for allowing a user to interact with capabilities, features or functions of a peripheral device. For example, assume that the device is a printer and one feature allows printing duplex pages. The duplex option may have values of Off, Long Edge, or Short Edge, so that the user can specify how duplexing is arranged. In FIG. 4, the Long Edge option is selected. Selection of the Long Edge option is an example of providing user input that is received at step 306 of FIG. 3.

The user selection of the Long Edge option of FIG. 4 can be converted to a job ticket 208 at step 308 of FIG. 3 having the form shown in Table 2:

TABLE 2

EXAMPLE JOB TICKET

```
<psf:Feature name= "psk:JobDuplexAllDocumentsContiguously">
<psf:Option name= "psk:TwoSidedLongEdge" />
</psf:Feature>
```

In an embodiment, a job ticket 208 having the format of Table 2 may be executed in a capability aware peripheral device 112 using job ticket consumer logic 214. In this approach, the combination of device capability data 206 and the job ticket 208 carry enough information for the application 110 to provide a user with a user interface representing features of the device and receive a user selection of an option or type appropriate for a particular job. However, neither the device capability aware application 110 nor any other software interacting with the application is required to be coded with an understanding of the substantive meaning of capabilities, features and functions.

Thus, a device manufacturer is not required to produce a custom device driver with specialized user interface for each permutation of device and platform. Further, the manufacturer can introduce new products and new features into existing products without releasing a new device driver and without requiring end user to upgrade their computers with the new device driver.

FIG. 5 illustrates example functions of device capability producer logic and device capability consumer logic.

In an embodiment, device capability producer logic 212, hosted in a device, performs the following functions. Step 502 comprises receiving a request from a device capability aware application to obtain capabilities of a peripheral device. For example, device capability producer logic 212 of device 112 receives a request from application 110 to provide the capabilities of the device.

In response, in step 504, the capabilities of the peripheral device at the current time are determined. Step 504 may comprise reading a registry, configuration file, management information base (MIB), or other repository of information that describes then-current capabilities of the device.

In step 508, a description of the capabilities is sent from the peripheral device to the device capability aware application. Step 508 may comprise forming device capability data 206 according to an XML schema such as the PrintSchema and encoding then-current capabilities, features and functions in the data. The data is sent to the application, as indicated by the arrow connecting step 506 to step 508.

In step 508, device capability consumer logic 202 receives the capability description from the device. In response, in step 510 the logic 202 creates one or more GUI elements based on the capability description and in step 512 the logic causes the GUI elements to be displayed. For example, the GUI of FIG. 4 is created and provided to a display or to the operating system 106 for display.

Step 514 comprises receiving user input representing selections of one or more GUI elements, and providing the user input to job ticket producer logic. For example, the device capability consumer logic 202 receives user input in the form of mouse clicks, keyboard strokes, or data representing user input, from the operating system 106 or its device drivers. The logic 202 transforms the selections if necessary and provides the user selections to job ticket producer logic 204 of application 110.

Figure 6:
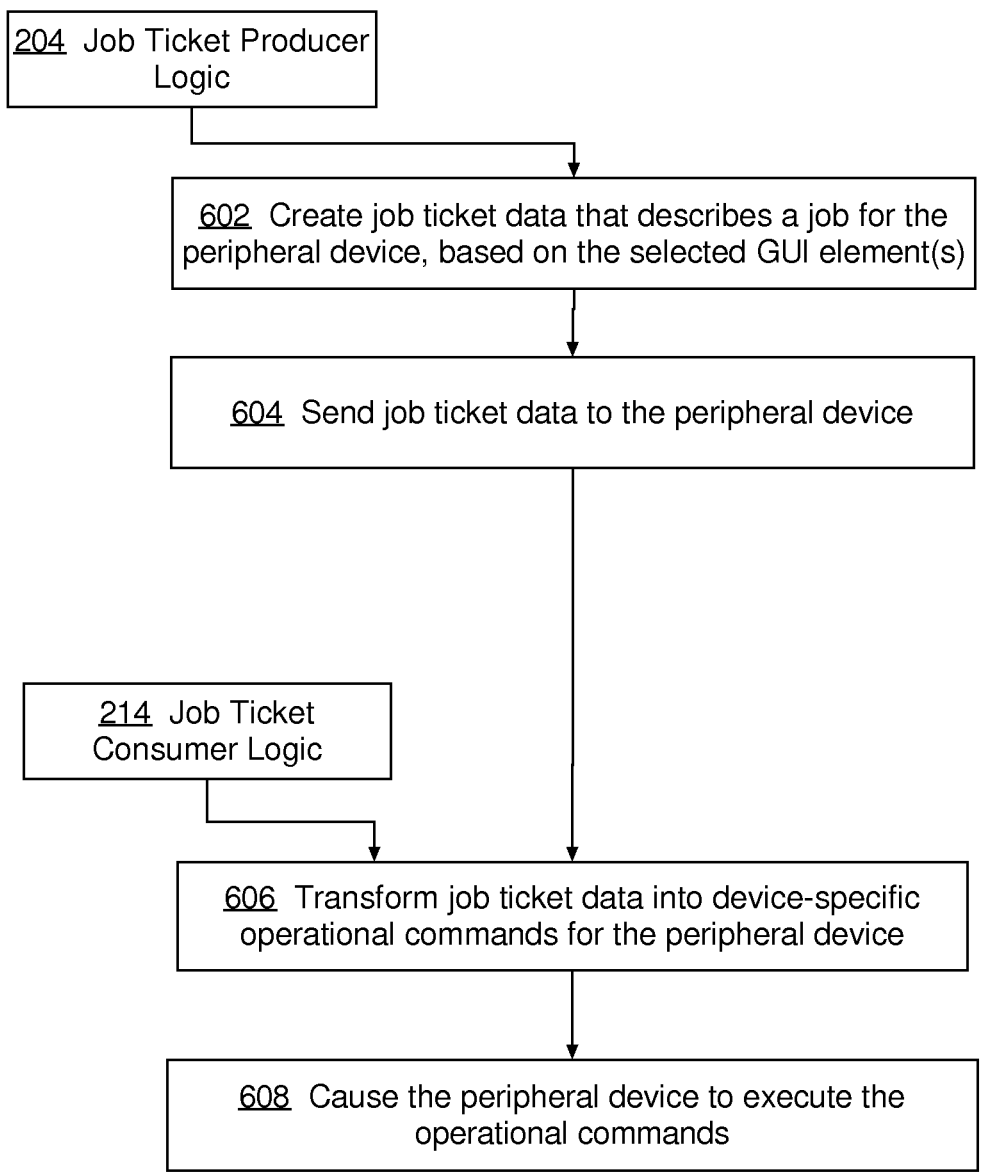
FIG. 6 illustrates example functions of job ticket producer logic and job ticket consumer logic.

FIG. 6 illustrates example functions of job ticket producer logic and job ticket consumer logic.

In step 602, the job ticket producer logic 204—having received the user selections from step 514 of FIG. 5—creates job ticket data that describes a job for the peripheral device, based on the selected GUI elements. Device capability data 206 is used to determine the job ticket data. For example, a job ticket 208 may comprise a transformation of the device capability data 206 in accordance with or based on the user selections of step 514. In step 604, the job ticket producer logic sends the job ticket data to the peripheral device.

In response, in step 606, the job ticket consumer logic 214 transforms the job ticket data into one or more device-specific operational commands for the peripheral device. Step 606 may comprise transforming job ticket 208 from a PrintSchema representation into one or more function calls, command-line instructions, method invocations, or other commands to the device. In an embodiment, the PrintSchema representation is transformed using an XML parser from Microsoft Corporation. In step 608, the job ticket consumer logic causes the device to execute the operational commands.

Figure 7:
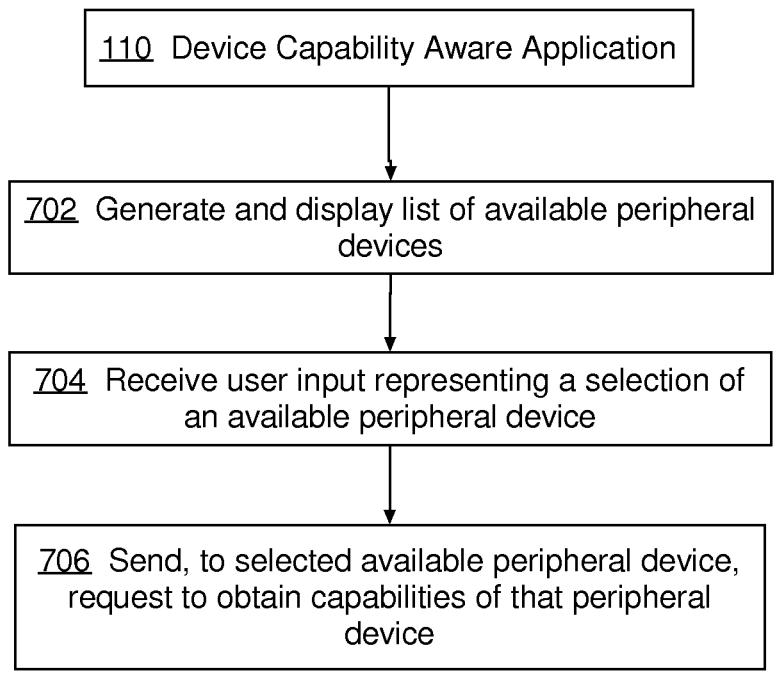
FIG. 7 illustrates example functions of a device capability aware application.

FIG. 7 illustrates example functions of a device capability aware application.

In step 702, a device capability aware application 110 generates and displays a list of available peripheral devices. For example, device capability aware application 110 receives a request from another application program, such as a word processor, to print a document. In response, the device capability aware application 110 determines which devices are known or available and causes displaying a list of all such devices. The devices can be discovered using a conventional discovery protocol. The list can be displayed in a graphical user interface using a widget such as a combo box.

In step 704, the device capability aware application receives user input representing a selection of an available peripheral device. For example, user input representing selection of one option in the combo box is received.

Step 706 comprises sending, to the selected available peripheral device, a request to obtain capabilities of that peripheral device. For example, the device capability aware application 110 sends a request to device 112 to obtain the then-current capabilities of that device for use in displaying the capabilities to a user and receiving user input for job settings for printing the document. Performing step 706 may result in triggering step 502 of FIG. 5.

One result of FIG. 5, FIG. 6 is that an application can request current capabilities of a device, generate a user interface representing the capabilities, receive user input for particular job settings, and provide the job settings to the device in a manner that causes the device to execute the job settings. The application is not required to understand the capabilities or have custom code that can generate the user interface. The application can be a universal device driver.

Further, the capabilities data is dynamically generated at the time of a request to interact with a peripheral device, based on then-current device capabilities. The approaches herein and the device capability aware application can work with any peripheral device that is capable of describing its capabilities in response to a request from the device capability aware application, and capable of parsing and executing commands expressed in a job ticket. No change is required in an application program or the way that a user interacts with the application program. No change is required in the operating system.

In an embodiment, the user experience is not changed as the user application continues to interoperate with a device driver in the form of device capability aware application 110, which acts as a universal device driver. However, the user interface with which the user interacts may vary from time to time as the peripheral device is updated, but no update to the device capability aware application 110 on the host computer is required.

2.2 Automatically Generating Capability-Based Computer Peripheral Device Drivers In an embodiment, a job ticket-based print stream is integrated into a printing system that is based on a page description language (PDL). Examples of PDLs are PostScript, PCL, and PII. An example of a PDL-based printing system is MICROSOFT WINDOWS VISTA. In an embodiment, a printer device and a printer driver exchange device capability data, job ticket data and device-independent printable data.

One result is that a printer driver can support new devices and features that are introduced after the driver is installed on a host computer by automatically generating and installing a new driver.

In an embodiment, the integration described above is achieved through logic or processes that can automatically generate a printer driver compatible with a specified operating system. For example, the techniques herein permit automatically generating a printer driver for MICROSOFT WINDOWS VISTA without significant user involvement. For example, a user is not required to manually locate or provide a driver file from a disk or other media. Further, the printer driver is automatically generated based on the printer's then-current capabilities as described by the printer. Thus, when a new printer is introduced into a computing environment, or when an existing printer is upgraded, the techniques herein can automatically generate and install a driver without significant user involvement or management of driver files.

Figure 9:
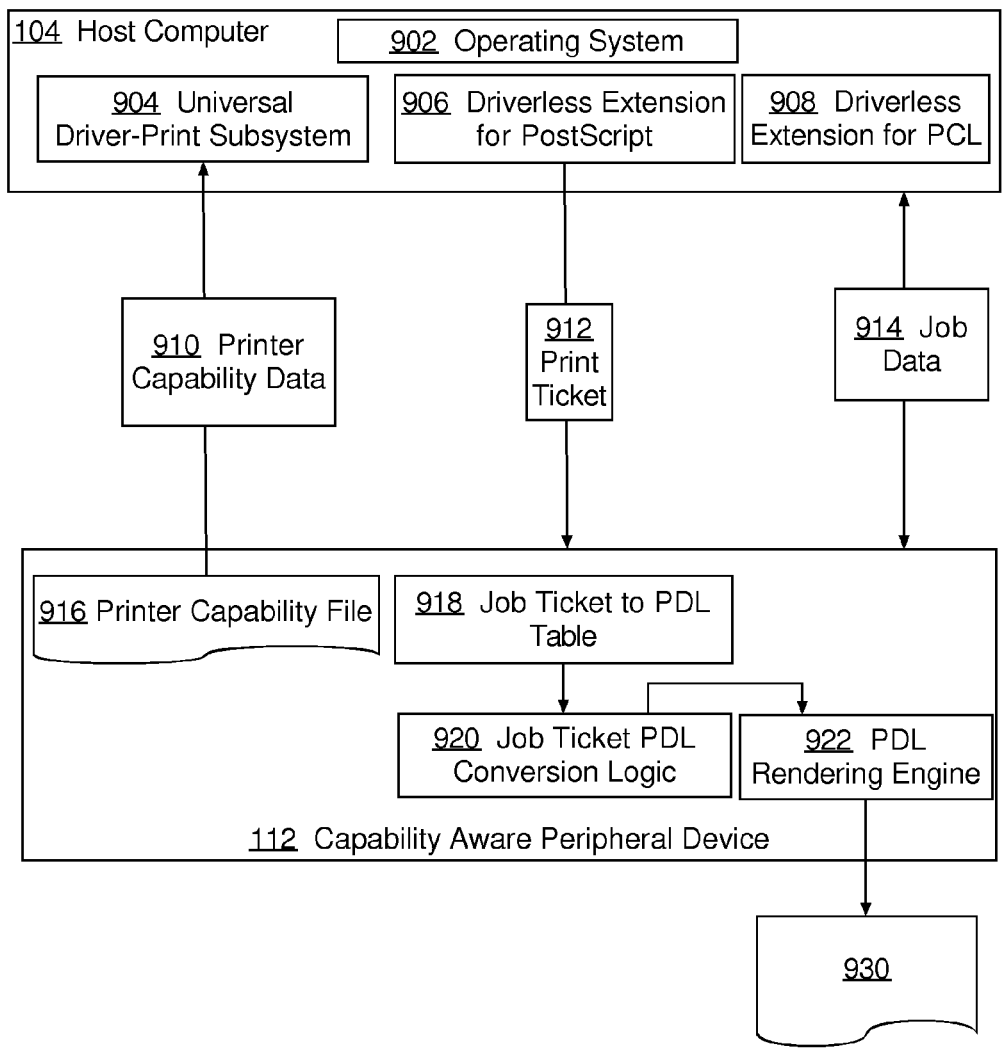
FIG. 9 illustrates an example system that integrates job ticket-based printing into PDL-based printing.

FIG. 9 illustrates an example system that integrates job ticket-based printing into PDL-based printing. A host computer 104 comprises an operating system 902, a universal driver-print subsystem 904, a driverless extension for PostScript 906, and a driverless extension for Page Control Language (PCL) 908. An example of operating system 902 is MICROSOFT WINDOWS VISTA. The universal driver-print subsystem 904 is configured to automatically load a device driver that can create job tickets and also generate instructions in Page Description Language (PDL) to drive a PDL-compatible device 112. The driverless extensions 906, 908 enable the universal driver-print subsystem 904 to integrate with PostScript devices and PCL devices. The functions of elements 904, 906, 908 is described further herein in later sections.

A capability aware peripheral device 112 comprises a printer capability file 916, a job ticket to PDL table 918, job ticket PDL conversion logic 920, and a PDL rendering engine 922. Generally, the capability aware peripheral device 112 is configured to send the printer capability file 916 in the form of printer capability data 910 to the universal driver-print subsystem 904 in response to a request from the subsystem.

In response, the subsystem 904 or extensions 906, 908 provide a print ticket 912 representing user selections of job settings. Concurrently or at a separate time, the device 112 receives job data 914 from an application. The capability aware peripheral device 112 transforms the job settings represented in the print ticket 912 and the job data into PDL commands and page data using job ticket to PDL table 918 and job ticket PDL conversion logic 920. The resulting PDL data is provided to the PDL rendering engine 922, resulting in generating printable page images. Using the printable page images, the device 112 can print one or more printed documents 930.

The example of FIG. 9 has been discussed in connection with printing. However, device 112 may be any PDL-compatible device and embodiments are not limited to printers. For example, device 112 may comprise a PDL-compatible graphics workstation.

Figure 10:
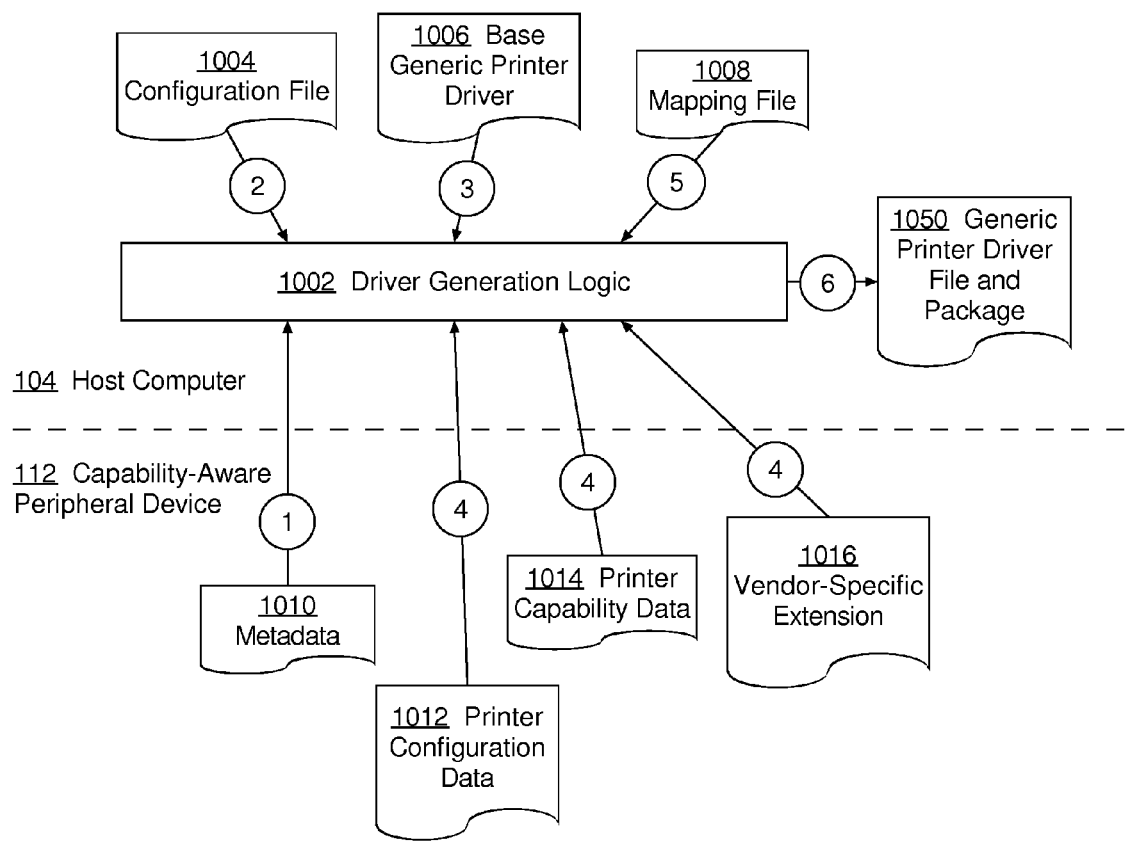
FIG. 10 illustrates automatically generating a printer driver based on device capabilities.

FIG. 10 illustrates automatically generating a printer driver based on device capabilities. Driver generation logic 1002 is hosted in host computer 104 and may correspond to or form a part of the universal driver-print subsystem 904. Generally, the driver generation logic 1002 is configured to automatically generate, on demand, a generic printer driver file and package 1050 based on input data representing core printer driver requirements as well as then-current capabilities of a driven device. "On demand" means that a driver may be generated when a user, application or system discovers the presence of a device coupled to the host computer or available in a network, or first attempts to use such a device, or in response to an explicit request of an application, user or system.

From the capability-aware peripheral device 112, the driver generation logic 1002 receives metadata 1010, which comprises data generally describing attributes of the device 112 such as a device name, network address, network port number, manufacturer name, model number, or other descriptive information. Metadata 1010 may comprise any kind of information generally describing the device 112 and embodiments are not limited to the metadata examples enumerated herein.

The driver generation logic 1002 further receives a configuration file 1004 from host computer 104. The configuration file 1004 may form part of operating system 902 and generally indicates how to configure and organize the generic printer driver file and package 1050. For example, configuration file 1004 may specify a location in the file system of host computer 104 at which to store the generic printer driver file and package 1050.

The generation logic 1002 further receives a base generic printer driver 1006. In an embodiment, the base generic printer driver 1006 is obtained from files associated with the operating system 902 and comprises code that is common to all device drivers that are compatible with the operating system. For example, the base generic printer driver 1006 may comprise code that can interoperate with operating system services such as a printer spooler, graphical user interface window manager, etc.

The generation logic 1002 further receives, from the capability-aware device 112, printer configuration data 1012, printer capability data 1014, and vendor-specific extension data 1016. In an embodiment, printer configuration data 1012 comprises model-specific configuration data for the device 112. For example, the printer configuration data 1012 can indicate that the device 112 is a PostScript printer. In an embodiment, printer capability data 1014 comprises a structured text list of one or more capabilities, features, and options of the device 112. In an embodiment, vendor-specific extension data 1016 comprises vendor-specific code that enables a device driver to interoperate with the specific device 112. For example, vendor-specific extension data 1016 may specify how to access a rendering engine within the device 112, or other services that the vendor of the device has implemented in firmware or software in the device.

The driver generation logic 1002 further receives a mapping file 1008 from host computer 104. In an embodiment, the mapping file 1008 is associated with operating system 902 and maps callback functions of the operating system to corresponding services of the device 112, or maps a name of a device feature to its universally recognized name in operating systems in different languages.

Based on receiving the foregoing information, driver generation logic is operable to automatically create the generic printer driver file and package 1050 upon demand or request.

Figure 11:
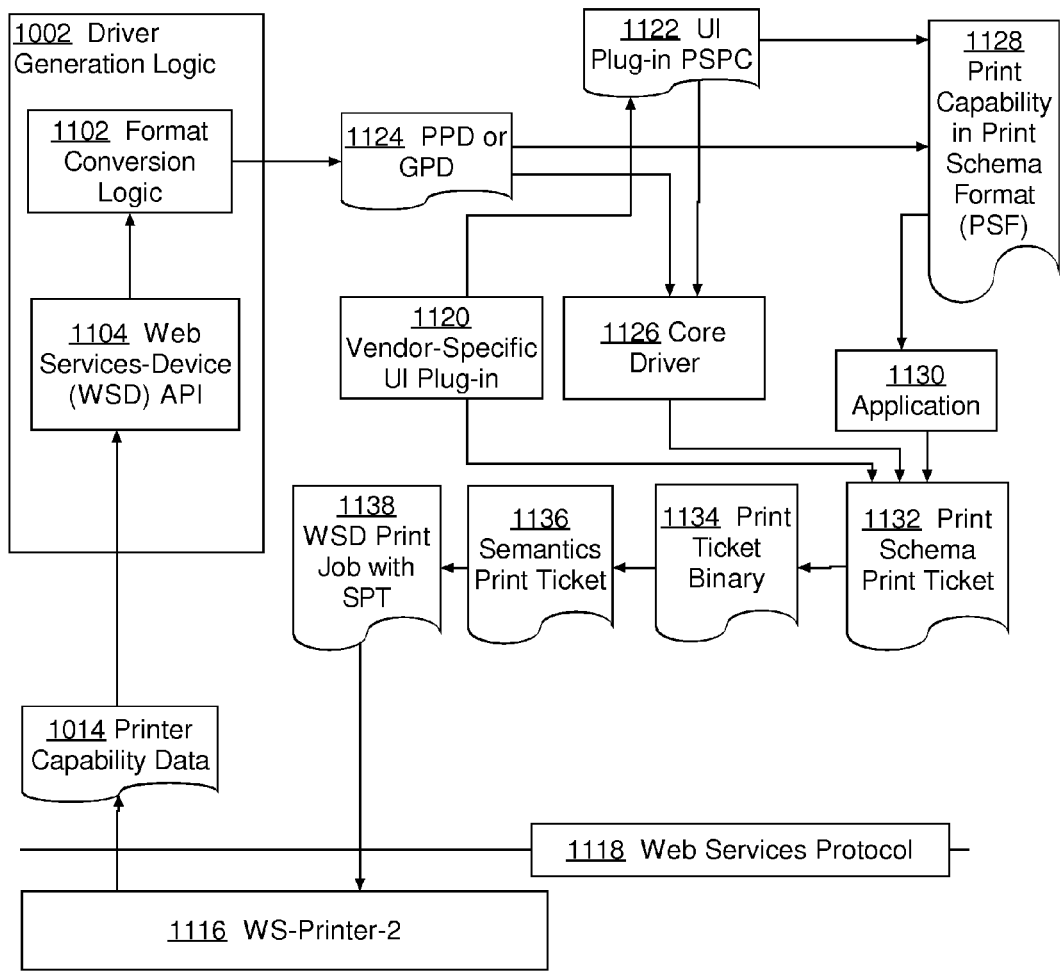
FIG. 11 illustrates data structures that may be used in automatically generating a device driver based on device capabilities.

FIG. 11 illustrates data structures that may be used in automatically generating a device driver based on device capabilities. Examples of such data structures are also provided in the APPENDIX to this description. In an embodiment, driver generation logic 1002 comprises format conversion logic 1102 and a Web Services-Device (WSD) API module 1104. Other elements in the upper portion of FIG. 11 may be implemented in the host computer 104 and communicate with a Web Services-Printer (WS-Printer-2) service in the device 112 using Web Services protocol 1118. Information about the Web Services protocol is available from the W3C consortium online at www.w3c.org.

The format conversion logic 1102 creates a generic printer description (GPD) file 1124. Driver generation logic 1002 causes the GPD 1124 to be integrated with a vendor-specific UI plug-in 1120; also, the GPD is used by the print subsystem to generate print capability data in Print Schema Print Capability format, resulting in creating and storing a Print Capability definition 1128 in Print Schema Format (PSF). Information defining the PSF is available from Microsoft Corporation. The driver generation logic 1002 uses a vendor-specific UI plug-in 1120 and core driver 1126 to create the Print Capability definition 1128.

Generally, a vendor of device 112 provides the vendor-specific UI plug-in 1120 and core driver 1126 to a vendor of the operating system 902, who causes the plug-in 1120 and core driver 1126 to ship to end users with or integrated into all copies of the operating system. Therefore, the plug-in 1120 and core driver 1126 are available in the operating system 902 whenever the driver generation logic 1002 needs to generate a driver.

The resulting Print Capability definition 1128 can be used to interact with a device and in one embodiment the definition is received by an application program 1130 which generates a Print Scheme Print Ticket 1132 based on the received definition and also based on input from the vendor-specific UI plug-in 1120 and core driver 1126. An example of application program 1130 is a word processor or spreadsheet.

The Print Schema Print Ticket is transformed to a print ticket binary 1134 and then to a semantics print ticket 1136. The semantics print ticket 1136 is used to generate a Web Services-Device (WSD) print job 1138 that includes the semantics print ticket. The job 1138 is sent using Web Services protocol 1118 to the device 112 to cause data to be printed.

FIG. 12 is a ladder diagram showing automatic driver creation and installation.

Steps of FIG. 12 are performed by elements of operating system 902, driver generation logic 1002, and a capability-aware device 112. In an embodiment, the driver creation function 1206 of FIG. 12 is an element of driver generation logic 1002. In an embodiment, device 112 comprises a Web Services-enabled printer 1214 as shown in FIG. 12.

In an embodiment, the operating system 902 comprises a driver setup API 1202, driver store 1204, network folder service 1208, function discovery API 1210, and network discovery provider 1212. The driver setup API 1202 enables applications to set up new device drivers in the host computer 104 by calling specified functions of the operating system as exposed in the API. The driver store 1204 comprises a database or other repository of data about device drivers that are installed, and is managed by the operating system. The network folder service 1208 comprises logic to display folders of information about devices and other resources that are in the host computer 104 or coupled to the host computer directly or indirectly using one or more networks. The function discovery API 1210 comprises logic that enables applications to discover functions in the operating system or in the network. The network discovery provider 1212 comprises logic that enables applications to discover devices or resources in a network to which the host computer 104 is coupled.

In an embodiment, automatically generating a device driver can occur in response to a user opening a network folder (step 1220), for example, when a user is attempting to use or locate a new device or a device that has been recently updated or moved. In response, network folder service 1208 sends a message to network discovery provider 1212, which issues a multicast message 1222 into a network to which the host computer 104 is coupled. The WSD printer 1214 receives the multicast message, recognizes its name in the message, and sends a response 1224. The response 1224 is received at a function discovery API 1210, which creates a function instance to represent the device as shown by step 1226. The function discovery API 1210 generates and sends a list of all known function instances representing devices to the network folder service 1208, which displays a list of the known or discovered devices at step 1230. The list may be displayed in a panel of a graphical user interface that the operating system manages.

At step 1232, user input is received to select one of the available devices from the displayed list. In response, a device driver for the selected device is automatically created at step 1234 by the driver creation logic 1206. The processes described elsewhere herein may be used to automatically generate the device driver on demand at this point using all then current capabilities of the selected device.

When creation of the device driver is complete, at step 1236 the driver store is updated to reflect the new driver. As a result, the operating system 902 becomes aware of the new driver and can reference and use the new driver in response to subsequent requests to interoperate with the device. The driver store 1204 may also launch an "add device" process at step 1238, which may take the form of an installation wizard. The setup API 1202 performs the "add device" process, resulting in completing installation of the new device at step 1240.

FIG. 13 is a ladder diagram illustrating a printing operation using an automatically generated printer driver. At step 1312, an application 1302 selects a printer driver. For example, a user instructs the application 1302 to print a document to a particular printer. In response, the application 1302 invokes print spooler 1304. The spooler 1304 issues a request to the driver for the particular printer to display a user interface showing available printer settings. In response, user interface service 1306 loads and displays a user interface showing a list of available printer settings that the printer's capabilities support, as indicated at step 1314.

The example of FIG. 13 now assumes that a user provides an input or makes a selection for each printer setting. In response, the user interface service 1306 also creates and stores a Print Ticket in Print Schema format for a printing job using the selected printer settings. After the user confirms the changes that were made to the printer settings by issuing a "print" command (or the equivalent in a different form), the print spooler 1304 sends a close request to the driver, and the user interface of the driver closes at step 1318, and the user interface service 1306 signals the spooler 1304 that user interface services are complete. In response, the spooler 1304 returns control, at step 1320, to the application, indicating that the printer property selection operation is complete and the system is ready to perform printing.

At step 1322, the application 1302 begins a printing operation and provides data for printing to the spooler 1304. The spooler 1304 signals the application 1302 that the data has been received and returns control to the application at step 1324. Concurrently, the spooler 1304 sends a job ticket to the printer using one of two alternative approaches.

In one alternative, after initializing but just before performing rendering, the spooler 1304 converts the Print Schema job ticket to a Semantic Schema job ticket and sends the converted job ticket to the printer together with the print job using PDL, at step 1326. In another alternative, after the initialization, the print processor 1304 converts the Print Schema job ticket to a Semantic Schema job ticket and sends the converted job ticket to the printer together with the print job using PDL, at step 1328.

3.0 Hardware Overview

Figure 8:
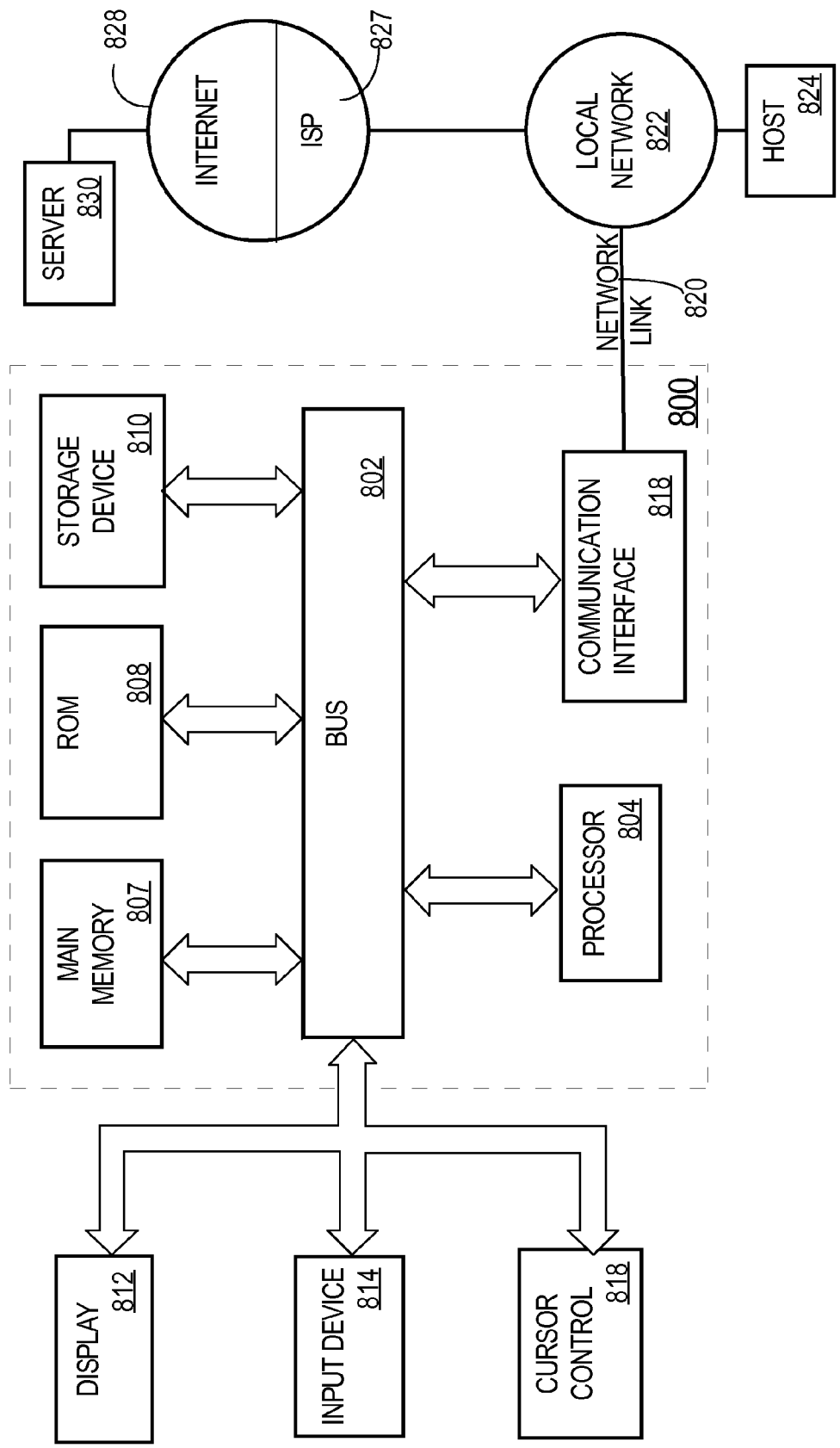
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX

EXAMPLE DATA STRUCTURES

| Config file: | |
|---|---|
| This file should include: | *PrintRateUnit: PPM |
| a. resource file | *GPDSpecVersion |

(Appendix continues in a separate 120-page document having a header of "RSID 1-591" and numbered as "Page 16 of 141" through "Page 141 of 141")

What is claimed is:

1. A data processing system, comprising:
   one or more processors;
   device driver generation logic that is encoded in one or more machine-readable storage media for execution and which, when executed by the one or more processors, is operable to perform:
      receiving a first capability description from a computer peripheral device, wherein the first capability description describes one or more capabilities of the computer peripheral device;
      receiving a generic device driver file;
      receiving configuration data;
      automatically generating a device driver for the computer peripheral device and for a computer operating system based on the first capability description, the generic device driver file and the configuration data;
   device job processing logic that is configured:
      to receive a request to provide a job to the computer peripheral device in a page description language (PDL),
      to dynamically generate a current capability description for the computer peripheral device in response to receiving the request to provide the job to the computer peripheral device in the PDL, wherein the current capability description comprises current capabilities recognized on the computer peripheral device at a time the request to provide the job to the computer peripheral device in the PDL was received, and
      to generate, based on the current capabilities description, and send to the computer peripheral device job ticket data, that describes the job for the computer peripheral device to perform, and
      to provide job data formatted in the PDL to the computer peripheral device.

2. The system of claim 1, wherein the device driver generation logic further comprises logic which when executed is operable to perform receiving, from the operating system, user input representing a request to install a newly discovered computer peripheral device, and performing the automatically generating in response to the user input.

3. The system of claim 1, wherein the device driver generation logic further comprises logic which when executed is operable to perform receiving, from the computer peripheral device, metadata that identifies attributes of the computer peripheral device, and wherein the logic for generating includes logic for generating the device driver based on the metadata.

4. The system of claim 1, wherein the device driver generation logic further comprises logic which when executed is operable to perform receiving, from the computer peripheral device, device configuration data that identifies model-specific features and options of the computer peripheral device, and wherein the logic for generating includes logic for generating the device driver based on the device configuration data.

5. The system of claim 1, wherein the device driver generation logic further comprises logic which when executed is operable to perform receiving a mapping file that maps a first set of resources of the computer peripheral device in a first language to a second set of resources in a second language, and wherein the logic for generating includes logic for generating the device driver based on the mapping file.

6. The system of claim 1, wherein the configuration data comprises rendering modules, user interface modules, and attribute values associated with building a device driver package.

7. The system of claim 1, wherein the device driver generation logic is configured to merge the job ticket data into a stream of the job data formatted in a the PDL that is sent to the computer peripheral device.

8. The system of claim 1, further comprising, in the computer peripheral device, job ticket consumer logic encoded in one or more machine-readable storage media for execution and when executed is operable to perform:
   transforming the job ticket data into one or more device-specific operational commands for the computer peripheral device;
   causing the computer peripheral device to execute the operational commands.

9. The system of claim 1, wherein the computer peripheral device comprises any of a printer, a multifunction printing device, a scanner, a finishing machine, a digital camera, or a monitor.

10. The system of claim 1, wherein the job ticket data comprises a subset of the first capability description.

11. The system of claim 1, wherein the first capability description comprises a list of features of the computer peripheral device, property names of properties of the features, values of the properties, and options for the properties, expressed in any of Job Definition Format (JDF) or Print Schema Specification.

12. The system of claim 1, wherein the first capability description comprises a list of features of the computer peripheral device and one or more feature constraints, wherein the one or more feature constraints comprise (a) limitations on the availability of the capabilities or (b) settings for capabilities that are required by an availability of another capability or by another setting of another capability.

13. The system of claim 1, wherein the device driver generation logic further comprises logic which when executed causes generating the device driver configured to display a list of a plurality of available peripheral devices, receive second user input representing a selection of one of the available peripheral devices, and send the request to the selected one of the available peripheral devices represented in the second user input.

14. A non-transitory machine-readable data storage medium encoded with one or more sequences of instructions which, when executed by one or more processors, cause the one or more processors to perform:
   receiving a first capability description from a computer peripheral device, wherein the first capability description describes one or more capabilities of the computer peripheral device;
   receiving a generic device driver file;
   receiving configuration data;
   automatically generating a device driver for the computer peripheral device and for a computer operating system based on the first capability description, the generic device driver file and the configuration data;
   receiving a request to provide a job to the computer peripheral device in a page description language (PDL);
   in response to receiving the request to provide the job to the computer peripheral device in the PDL, dynamically generating a current capability description for the computer peripheral device, wherein the current capability description comprises current capabilities recognized on the computer peripheral device at a time the request to provide the job to the computer peripheral device in the PDL was received;
   generating, based on the current capability description, and sending to the computer peripheral device job ticket data that describes the job for the computer peripheral device to perform;
   providing job data formatted in the PDL to the computer peripheral device.

15. The machine-readable storage medium of claim 14, further comprising instructions which when executed are operable to perform receiving, from the operating system, user input representing a request to install a newly discovered computer peripheral device, and performing the automatically generating in response to the user input.

16. The machine-readable storage medium of claim 14, further comprising instructions which when executed are operable to perform receiving, from the computer peripheral device, metadata that identifies attributes of the computer peripheral device, and wherein the logic for generating includes logic for generating the device driver based on the metadata.

17. The machine-readable storage medium of claim 14, further comprising instructions which when executed are operable to perform receiving, from the computer peripheral device, device configuration data that identifies model-specific features and options of the computer peripheral device, and wherein the logic for generating includes logic for generating the device driver based on the device configuration data.

18. A computer-implemented method, comprising:
   receiving a first capability description from a computer peripheral device, wherein the first capability description describes one or more capabilities of the computer peripheral device;
   receiving a generic device driver file;
   receiving configuration data;
   automatically generating a device driver for the computer peripheral device and for a computer operating system based on the first capability description, the generic device driver file and the configuration data;
   receiving a request to provide a job to the computer peripheral device in a page description language (PDL);
   dynamically generating a current capability description for the computer peripheral device in response to receiving the request to provide the job to the computer peripheral device in the PDL, wherein the current capability description comprises current capabilities recognized on the computer peripheral device at a time of the request to provide the job to the computer peripheral device in the PDL was received;
   generating, based on the current capability description, and sending to the computer peripheral device job ticket data that describes the job for the computer peripheral device to perform;
   providing job data formatted in the PDL to the computer peripheral device;
   wherein the method is performed by one or more computing devices.

19. The method of claim 18, further comprising receiving, from the operating system, user input representing a request to install a newly discovered computer peripheral device, and performing the automatically generating in response to the user input.

20. The method of claim 19, further comprising receiving, from the computer peripheral device, metadata that identifies attributes of the computer peripheral device, and wherein the logic for generating includes logic for generating the device driver based on the metadata.

* * * * *